UNITED STATES PATENT OFFICE 2,444,395

ALKYL-AMINO-ALKYL PARA-ALKOXY-BENZOATES

Walter G. Christiansen, Glen Ridge, and George O. Chase, Hawthorne, N. J., assignors to E. R. Squibb & Sons, New York, N. Y., a corporation of New York No Drawing. Continuation of application Serial No. 353,920, August 23, 1940. This application July 20, 1944, Serial No. 545,884

12 Claims. (Cl. 260—473)

This application is a continuation of Christiansen and Aste application Serial No. 353,920, filed August 23, 1940, now abandoned.

This invention relates to, and has for its object the provision of, certain amino-esters, acid-addition salts thereof, and a method of preparing them. These amino-esters have the general formula

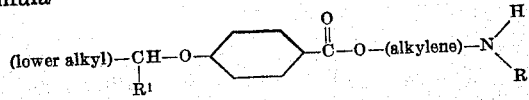

wherein R represents a member of the group consisting of lower alkyl and hydroxy-(lower alkyl), especially lower alkyl, and R¹ represents a member of the group consisting of hydrogen and lower alkyl, especially hydrogen.

The subject-matter of this application is related to that of Christiansen and Harris application Serial No. 163,034, filed September 9, 1937, now abandoned, the compounds of the former being N-mono-substituted analogs of the N-di-substituted compounds of the latter.

The compounds of this invention are valuable therapeutic agents, being particularly effective for inducing local anesthesia. They have local-anesthetic activities of the same order as the superior local anesthetic diethoxin (β-diethylamino-ethyl p-ethoxy-benzoate hydrochloride), as determined by corneal tests in rabbits (with both aqueous and buffer solutions), intradermal tests in guinea pigs (with both aqueous and buffer solutions), and sciatic nerve block tests (with aqueous solutions). Moreover, these compounds cause no irritation corneally, and, as determined by tests in mice, have intravenous toxicities significantly lower than that of diethoxin (the compound of Example 2, for instance, having half the intravenous toxicity of diethoxin).

The amino-esters of this invention may be prepared by reacting an aracyl halide of the general formula

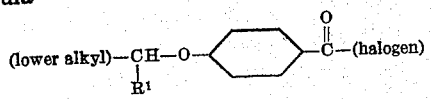

with an amino-alcohol of the general formula

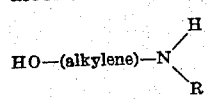

R and R¹ having the meaning given hereinabove. The amino-esters are generally recovered in the form of their acid-addition salts with hydrochloric acid; but other acids forming addition salts with amines may be used in place of hydrochloric; for example, boric, nitric, lactic, tarchloric, citric, phosphoric, sulfuric, picric, and picrolonic. The addition salts may be converted into the free bases in the usual manner.

The following examples are illustrative of the invention:

EXAMPLE 1

β-[N-(β-hydroxy-ethyl)-amino]-ethyl ester of p-n-butoxy-benzoic acid (hydrochloride)

21.2 g. p-n-butoxy-benzoyl chloride dissolved in 50 cc. dry ether is added dropwise to 31.5 g. diethanolamine vigorously stirred in an equal volume of dry ether; and the reaction mixture is refluxed several hours, and, after cooling, is extracted with dilute hydrochloric acid. The aqueous layer is alkalinized with aqueous sodium hydroxide, the liberated base extracted with ether, the extract washed with water until an aliquot of the wash water can be neutralized with a small constant volume of N/10 sulfuric acid, and the dry ether extract treated with ethereal hydrogen chloride to precipitate the hydrochloride. The solid obtained is purified by dissolving in absolute alcohol and precipitating with dry ether. The compound yields a hazy 1% aqueous solution having a pH of 3.80.

EXAMPLE 2

β-ethylamino-ethyl ester of p-ethoxy-benzoic acid (hydrochloride)

13.8 g. p-ethoxy-benzoyl chloride dissolved in 50 cc. dry ethylene dichloride is treated with 6.5 g. of β-ethylamino-ethanol dissolved in 50 cc. dry ethylene dichloride; the reaction mixture is refluxed for 20-30 minutes, and, after cooling, is extracted with dilute hydrochloric acid; the aqueous layer is alkalinized with aqueous sodium hydroxide and the liberated base extracted with ether. The ethereal solution is washed with 100 cc. portions of water until a 10 cc. aliquot requires a small constant volume of N/10 H₂SO₄ to neutralize it, and is then dried over K₂CO₃, and the hydrochloride precipitated with ethereal hydrogen chloride. The product so obtained weighs 7.8 g. and melts at 153-154° C. After one recrystallization from acetone or a mixture of acetone and alcohol, the melting point is constant at 154-155° C. The compound is a white solid yielding a clear 1% aqueous solution having a pH of 5.9.

EXAMPLE 3

β-ethylamino-ethyl ester of p-n-butoxy-benzoic acid (hydrochloride)

This compound is prepared by using p-n-butoxy-benzoyl chloride in place of p-ethoxy-benzoyl chloride in the procedure of Example 2. The compound is a white solid melting at 136° C. and yielding a clear 1% aqueous solution having a pH of 5.95.

EXAMPLE 4

β-n-amylamino-ethyl ester of p-ethoxy-benzoic acid (hydrochloride)

This compound is prepared by using β-n-amylamino-ethanol in place of β-ethylamino-ethanol in the procedure of Example 2. The compound is a white solid melting at 132.5–133.5° C. and yielding a clear 1% aqueous solution having a pH of 5.9.

EXAMPLE 5

β-isobutylamino-ethyl ester of p-ethoxy-benzoic acid (hydrochloride)

This compound is prepared by using β-isobutylamino-ethanol in place of β-ethylamino-ethanol in the procedure of Example 2. The compound is a white solid melting at 185–186° C. and yielding a clear 1% aqueous solution having a pH of 5.95.

Manifestly, a variety of other amino-esters and acid-addition salts thereof embraced by the general formula given hereinbefore may be obtained by reacting the appropriate aracyl halide with the appropriate amino-alcohol. In addition to those used in the foregoing examples, the utilizable aracyl halides include, inter alia:

p-n-propoxy-benzoyl chloride
p-isopropoxy-benzoyl chloride
p-allyloxy-benzoyl chloride
p-isoamyloxy-benzoyl chloride In addition to those used in the foregoing examples, the utilizable amino-alcohols include, inter alia:

2-ethylamino-cyclohexanol
4-ethylamino-2-butanol

The invention may be variously otherwise embodied, within the scope of the appended claims.

We claim:

1. A compound of the group consisting of: amino-esters of the general formula

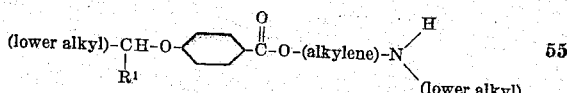

wherein $R^1$ represents a member of the group consisting of hydrogen and lower alkyl; and acid-addition salts thereof.

2. An acid-addition salt of an amino-ester of the general formula

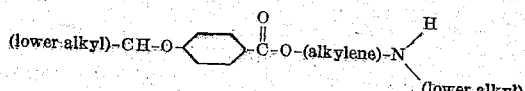

3. An acid-addition salt of an amino-ester of the general formula

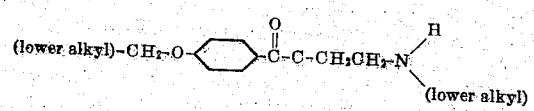

4. The hydrochloride of β-ethylamino-ethyl p-ethoxy-benzoate.

5. The hydrochloride of β-ethylamino-ethyl p-n-butoxy-benzoate.

6. The hydrochloride of β-isobutylamino-ethyl p-ethoxy-benzoate.

7. As new products, compounds of the structure

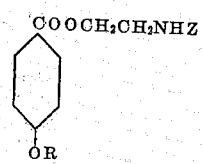

where R is an alkyl radical containing from 2 to 5 carbons and Z is a primary alkyl radical containing from 2 to 5 carbons.

8. As new products, salts of the alkoxy-benzoic acid esters of claim 7.

9. As new products, alkoxybenzoic acid ester hydrochlorides of the structure

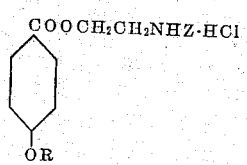

where R is an alkyl radical containing from 2 to 5 carbons and Z is a primary alkyl radical containing from 2 to 5 carbons.

10. As new products, compounds of the structure

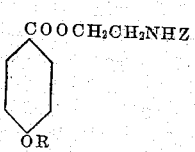

where R is a lower alkyl radical and Z is a primary lower alkyl radical.

11. As new products, salts of the alkoxybenzoic acid esters of claim 10.

12. As new products, alkoxybenzoic acid ester hydrochlorides of the structure

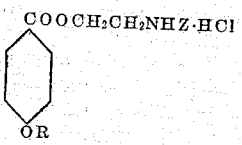

where R is a lower alkyl radical and Z is a primary lower alkyl radical.

WALTER G. CHRISTIANSEN.
GEORGE O. CHASE.

REFERENCES CITED

The following references are of record in the file of this patent:

UNITED STATES PATENTS

| Number | Name | Date |
| --- | --- | --- |
| 1,193,650 | Wildman | Aug. 8, 1916 |
| 2,081,712 | Rohmann | May 25, 1937 |